United States Patent Office 3,754,070
Patented Aug. 21, 1973

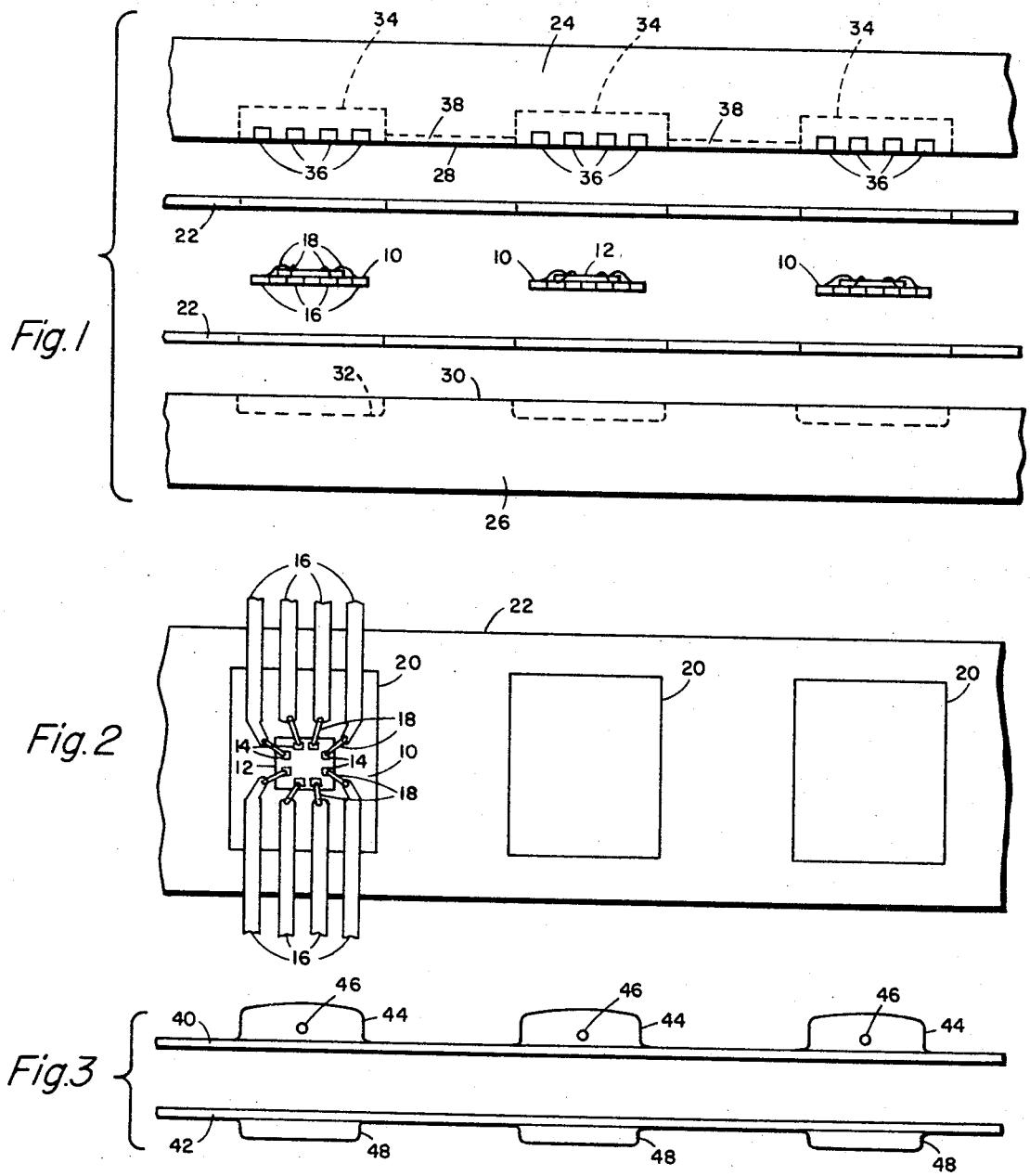

3,754,070
FLASH FREE MOLDING
Thomas A. Dunn, Mesa, and Arthur V. Fant, Phoenix, Ariz., assignors to Motorola, Inc., Franklin Park, Ill.
Filed Aug. 3, 1970, Ser. No. 60,339
Int. Cl. B29b 6/00; H01b 13/00
U.S. Cl. 264—272                              3 Claims

ABSTRACT OF THE DISCLOSURE

When plastic encapsulating a device such as an integrated circuit having leads, the leads must extend out of the mold that is used in the encapsulating. The plastic material has a tendency to run out of the mold cavities and around the leads, impeding the use of the encapsulated device. To prevent this running out, tape is applied to both sides of the leads before the device is put into the mold. The tapes may be sticky on their contacting sides or they may be stuck together by heat staking or spot welding. When the mold is closed on the taped leads, any plastic material that runs out of the mold and along the leads will be outside of the plastic material that encompasses the leads and this plastic material will be peeled off when the sticky tape is peeled off. Since the plastic material has a tendency to stick to the inside of the mold cavities, plastic sheets having bubbles therein somewhat smaller than the mold cavities are applied to both sides of device to be encapsulated, the tape holding the leads, and the bubbles enclosing the device and a portion of the leads and connections between the device and the leads, and then the device so covered is put into the mold cavities. Holes are provided in the bubbles to permit access of molding material and the plastic material does not touch the inside of the mold cavities whereby the plastic material does not stick to the inside of the mold cavities.

BACKGROUND

This invention relates to plastic encapsulation of electronic devices.

When plastic encapsulating a device such as an integrated circuit, hereinafter called a chip, having leads, the device is put into a mold cavity with the leads extending out of the cavity and plastic material is injected into the mold in liquid or semi-liquid form and under high pressure. Due to its fluidity, the plastic material runs out of the mold through all crevices and therefore runs out around the leads. When the plastic material has hardened and the mold is opened to take out the plastic encapsulated device, the hardened material not only surrounds the chip and the leads near the chip as it is desired but the material also surrounds or partially surrounds the leads where it is desired that they be clear of plastic material. In accordance with the prior art, the encapsulated device is then subjected to an additional step of removing plastic material from the leads, this removal step taking time, adding expense to the encapsulated device, and not always being successful.

Furthermore, the plastic material that is used for encapsulating and that is forced into the mold cavities has a tendency to stick to the inside of the cavity, making it difficult to remove the encapsulated device in salable form. In accordance with the prior art, the inside of the cavities are polished and also a nonstick material called a release agent is added to the plastic material, both for the purpose of making it easier to take the encapsulated device out of the cavity. The polished cavity mold is more expensive than an unpolished one and the release agent also tends to prevent the plastic material from sticking to the device to be encapsulated and to the leads thereof near the body of the device whereby the body of the device is not heremetically sealed.

It is an object of this invention to provide a method and an apparatus for preventing plastic material from sticking to leads of a device being encapsulated.

It is a further object of this invention to provide a method and an apparatus for preventing plastic material from sticking to the mold in which a device is encapsulated and for providing heremetically sealed devices.

SUMMARY

According to this invention, tapes are provided which may or may not be sticky on one side thereof and which have holes placed along the length thereof. If sticky tapes are used, the device to be encapsulated is positioned on one tape in such a manner that the body of the device and the inner parts of the leads register with respective holes in the tape and the intermediate portions of the leads are in contact with the sticky side of the tape. Then another tape is placed over the device in a similar manner, the sticky side of the other tape also contacting the intermediate portion of the leads. If nonsticky tapes are used, the two tapes are stuck together by heat staking or by spot welding to hold the body of the device and the inner parts of the leads therebetween. The two tapes, holding the devices to be encapsulated, are placed on a lower member of a pair of mold members in such a manner that the holes in the tape coincide with or are centrally located with respect to respective mold cavities and the upper member of the mold is placed over the lower member of the mold so that the cavities therein register with the cavities in the lower member, whereby the device to be encapsulated and the inner ends of the leads thereof are contained in the mold cavities and the tape covered leads are positioned between the mold members, which may or may not be formed to fit the leads. The tapes covering the leads are compressed around the leads so that when the plastic material is forced into the mold cavities, the material either does not leak out of the mold cavities or, if it does, it contacts the outside of the tapes and not onto the leads between the tapes. Under either condition, as soon as the encapsulation is completed and the tapes on the encapsulated device are removed from the mold, by stripping away the tapes, encapsulated devices having clean leads are provided.

Further, in accordance with this invention, instead of tapes with holes, tapes with bubbles are provided and the body of the device and the inner ends of the leads are placed in the bubbles in the tapes, the contacting portion of the tapes again encompassing the leads. A hole or holes are provided in the bubbles and the bubbles are somewhat smaller than the mold cavities in which they are placed. When the mold is closed around the bubbles in the tape, and the plastic material is forced into the cavities, the plastic material will go into the bubbles and stretch them sufficiently so that the bubbles fit the cavities tightly. However, the tapes will now not only prevent the plastic material from contacting the leads outside of the mold cavities but the tapes will prevent the plastic material from touching the inside of the mold cavities, and the plastic material, since it does not touch the mold cavities, cannot stick thereto. Therefore, the inside of the mold cavities need not be polished and no release agent need be added to the plastic material to reduce sticking of plastic material to the inside of the mold cavities. Furthermore, the absence of release agents leads to better encapsulation since the release agent usually used has a tendency to prevent sticking of the plastic material to the leads and to the body of the device, whereby a hermetically sealed encapsulation is not always produced when a release agent is used in the encapsulating material.

Whether one uses the tapes with holes, or the tapes with bubbles, loading the cavities of this mold is expedited since many devices are handled by handling the tape.

DESCRIPTION

The invention will be better understood upon reading the following description in connection with the accompanying drawing in which FIG. 1 is an exploded elevational view of the apparatus of this invention and as used in the method of this invention, FIG. 2 is a plan view of parts of FIG. 1, and FIG. 3 is an elevational view showing a modification of the apparatus of FIG. 1.

As shown in FIGS. 1 and 2, the device 10 to be plastic encapsulated comprises an IC or chip 12 having a circuit (not shown) deposited thereon and bonding pads 14 to which external connections are to be made. The external connections comprise leads 16, and electrical connections 18 are provided between the inner ends of the leads 16 and the pads 14. The leads 16 are sufficiently strong and long as to be used for connection to other devices. The connections 18 may be flat remnants of a first lead frame or may be individual wires which connect pads 14 to respective leads 16. The chips 12, lead connections 18 and the inner ends of the leads 16 inside the hole 20 in the tape 22 are to be encapsulated in plastic material by means of the mold comprising the upper member 24 and the lower member 26. The members 24 and 26 have flat facing surfaces 28 and 30 respectively. The upper surface 30 of the lower member 26 has a cavity 32 formed therein to receive plastic encapsulating material. The upper member 24 has a mating cavity 34 for receiving the body of the device 10 and enough plastic encapsulation material to cover it. Grooves 36 which are not usually necessary may be provided to receive the leads 18. As shown, the grooves 36, if used, may be a little larger than leads 18 in cross section since portions of the tape 22 will be contained therein, as will be explained.

The tapes 22 are similar in that they have holes 20 therein. If sticky tapes are used, the facing sides are sticky. The tapes may be made of any suitable material that can withstand the molding temperatures, one suitable material being polyester.

In practicing this invention, a device 10 is placed on a tape 22 with a chip 12, the connections 18 and the inner parts of the leads 16 (that is, the body of the device 10) symmetrically positioned in the hole 20, the intermediate portion of the leads 16 contacting a side of the tape 22. Then another tape 22 is put on the tape 22 with the holes 20 of the two tapes in registry, whereby the body of the device 10 comprising the chip 12, the connections 18 and the inner ends of the lead 16 are in the holes 20 and the two contacting tapes 22 and the intermediate portions of the leads 16 are between or encompassed by both tapes 22. If sticky tapes are used, the mere contacting them will hold them together. If nonsticky tapes are used, they are heat staked or spot welded together. Then the two tapes 22 with their device 10 are placed on the lower mold member 26 so that the holes 20 register with the cavity 32 or are arranged symmetrically with respect thereto.

Then the upper mold member 24 is placed over the lower mold member 26 with the two cavities 32 and 34 in registry and with the leads 16 in the grooves 36 (if grooves 36 are used), to hold the device 10 in proper position for molding. Then the two mold members 24 and 26 are clamped together and fluid plastic encapsulating material is run under pressure into the cavities 32 and 34 in any known manner such as by runners 38. Due to the tapes 22, no encapsulating material will run out of the mold through the grooves 36 or if some material does run out of the molds, this material will be on the outside surfaces of the tapes 22 and will not contact the intermediate portion of the leads 16. Therefore, when the mold is opened and the tapes 22, together with the device 10, are pulled out of the mold, the leads 16 will be clear of encapsulating material for the length thereof extending from the inner edges of the mold cavities 32 and 34 outwards, even though some encapsulating material may have leaked onto the outer surfaces of the tapes 22. As is understood, this last mentioned encapsulating material may be gotten rid of by peeling the tapes 22 off of the leads 16.

Encapsulating material has a tendency to stick to the surface that it contacts when the material is in fluid condition. It therefore has a tendency to stick to the insides of the mold into which it is run, making removal thereof when hardened difficult. To minimize this effect, the insides of the mold are polished and nonstick material, known as a release agent, is mixed with the encapsulating material. However, the release agent tends to prevent sticking of the encapsulating material to the encapsulated portions of the device being encapsulated, whereby a good hermetic seal is not provided by plastic encapsulation of a device with a plastic material having a release agent. To prevent sticking of the encapsulating material to the inside of the mold cavity and to provide an encapsulated device which is hermetically sealed, an encapsulating material which lacks a release agent is used with the tapes 40 and 42 which are shown in FIG. 3.

The tape 40 of FIG. 3 resembles the upper tape 22 in that the tape 40 is flat where the tape 22 is flat and the facing surfaces of both are sticky, or nonstick tape is used. The tape 40 differs from the tape 22 in that instead of having a hole 20 in the tape 40, a bubble 44 is provided in the upper surface of the tape 40. The bubble 44 fits into but is slightly smaller than the cavity 34. The bubble 44 has a small hole 46 therein, located to permit encapsulating material to flow into the bubble 44 when the encapsulating material is forced into the mold as will be further explained. The lower tape 42 resembles the tape 40 except that the bubbles 48 are of a size to fit loosely into the cavity 32. A hole such as hole 46 may or may not be provided for the bubble 48.

The tapes 40 and 42 are used in the same manner as the tapes 22. That is, the body of the device 10 is put on the tape 42 with the chip 12 centered on the bubble 48 and the intermediate portions of the leads 16 in contact with the side of the tape 42. The tape 40 is put over the assembly of the tape 42 and the device 10, with the bubbles 44 and 48 in registry. Then the assembly of the device 12 and the two tapes 40 and 42 are put on the lower mold member 26 with the bubbles 48 centered with respect to the cavities 32 and the upper mold member 24 is put over the tape 40 with the bubbles 44 centered with respect to the cavities 34. The two mold members 24 and 26 are clamped together and the encapsulating material is forced into the cavities 32 and 34 in a known manner. The material will go into the bubbles 44 by way of the holes 46 and expand the bubbles 44 and 48 to fit the mold cavities 34 and 32 respectively, and since no encapsulating material touches the inside of the cavities 32 and 34, the material cannot stick thereto. Therefore, the cavity surface need not be polished and no release agent need be mixed with the encapsulating material. Since no lrelease agent is included in the encapsulating material, encapsulating material will stick to the portions of the leads 16 that are within the bubbles 44 and 48 and to the connections 18 and to the chip 12, whereby the encapsulated device is hermetically sealed. Furthermore, since the tapes 40 and 42 encompass the intermediate portions of the leads 16, the leads 16 beyond the bubbles 44 and 48 have no encapsulating material stuck thereto. The tapes 40 and 42 may be peeled away from the several devices upon completion encapsulation thereof.

The cavity 32 has been shown to have a lesser depth than the cavity 34. These two cavities may have any desired depths.

What is claimed is:

1. A method of encapsulating an electrical device having a body portion and leads each having first and second sides, which method includes the steps of:

placing selected portions of the first sides of the leads and a surface of a first tape against each other so that the body of the electrical device is registered with the inside of a first bubble provided in said first tape;

placing selected portions of the second sides of the leads and a surface of a second tape against each other with the body of the electrical device being also registered with the inside of a second bubble provided in said second tape and with said first and second bubbles registered with each other to form a chamber enclosing said body portion of said electrical device;

injecting encapsulating material into said chamber to encapsulate the body of the electrical device; and removing said first and second tapes from the leads of the electrical device after said encapsulating material has set.

2. The method of claim 1 further including the steps of:

positioning said bubble of said first tape within a cavity portion of a first mold member and said bubble of said second tape within a cavity portion of a second mold member;

closing said mold members on said tapes before the step of injecting said encapsulating material into said chamber formed by said bubbles of said tapes; and opening said mold members after said encapsulating material has set and removing said tapes and said electrical devices from said mold members before said step of removing said first and second tapes from said leads.

3. The method of claim 2 wherein said encapsulating material does not include a release agent.

References Cited

UNITED STATES PATENTS

| 3,374,536 | 3/1968 | Schroeder et al. | 264—272 X |
| 2,517,430 | 8/1950 | Hensel et al. | 156—16 X |
| 3,421,962 | 1/1969 | Topas | 156—16 X |
| 3,539,675 | 11/1970 | Hugill | 264—276 X |
| 3,618,200 | 11/1971 | Matsuo et al. | 29—588 X |
| 3,531,856 | 10/1970 | Bell et al. | 29—588 X |

GEORGE F. LESMES, Primary Examiner

L. T. KENDELL, Assistant Examiner

U.S. Cl. X.R.

29—588; 156—47, 48

UNITED STATES PATENT OFFICE
CERTIFICATE OF CORRECTION

Patent No. 3,754,070                    Dated August 21, 1973

Inventor(s) Thomas A. Dunn, et al.

It is certified that error appears in the above-identified patent and that said Letters Patent are hereby corrected as shown below:

Column 1, between lines 27-28, after "of" insert -- the --;

line 53 after "as" delete "[it]".

Column 2, lines 2 and 9 "heremetically" should read

-- hermetically --.

Column 3, line 27, "chips" should read -- chip --.

Column 4, line 19 after "agent" insert -- also --;

line 59, "inside" should read -- insides --;

line 62, "lre" should read -- re --;

line 72, after "completion" insert -- of the --.

Claim 1, line 15, "registered" should read -- registering --.

Signed and sealed this 30th day of April 1974.

(SEAL)
Attest:

EDWARD M. FLETCHER, JR.
Attesting Officer

C. MARSHALL DANN
Commissioner of Patents